(12) United States Patent
Boyle

(10) Patent No.: US 10,540,555 B2
(45) Date of Patent: *Jan. 21, 2020

(54) SYSTEM, SERVER AND DATA CAPTURE DEVICE FOR ROADSIDE ASSET TRACKING AND MAINTENANCE MONITORING

(71) Applicant: Norman Boyle, Tura Beach (AU)

(72) Inventor: Norman Boyle, Tura Beach (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,326

(22) Filed: May 20, 2019

(65) Prior Publication Data

US 2019/0279002 A1     Sep. 12, 2019

Related U.S. Application Data

(63) Continuation of application No. 15/543,318, filed as application No. PCT/AU2016/050016 on Jan. 15, 2016, now Pat. No. 10,346,691.

(30) Foreign Application Priority Data

Jan. 16, 2015     (AU) ................ 2015900127

(51) Int. Cl.

| G06K 9/00 | (2006.01) |
| G06Q 10/10 | (2012.01) |
| G06F 16/583 | (2019.01) |
| G06F 16/29 | (2019.01) |
| H04L 29/08 | (2006.01) |
| G06F 16/58 | (2019.01) |
| G06Q 10/00 | (2012.01) |
| G06K 9/46 | (2006.01) |
| G06K 9/62 | (2006.01) |
| G06Q 10/08 | (2012.01) |
| A01D 43/00 | (2006.01) |

(Continued)

(52) U.S. Cl.
CPC ......... *G06K 9/00791* (2013.01); *A01D 43/00* (2013.01); *G06F 16/29* (2019.01); *G06F 16/5838* (2019.01); *G06F 16/5866* (2019.01); *G06F 16/9537* (2019.01); *G06K 9/4604* (2013.01); *G06K 9/4652* (2013.01); *G06K 9/6202* (2013.01); *G06Q 10/087* (2013.01); *G06Q 10/10* (2013.01); *G06Q 10/20* (2013.01); *H04L 67/12* (2013.01); *H04L 67/18* (2013.01); *A01D 2101/00* (2013.01); *G06K 2209/01* (2013.01)

(58) Field of Classification Search
CPC ............. G06K 9/00791; G06K 9/4604; G06K 9/4652; G06K 9/6202; G06K 2209/01; G06F 17/30241; G06F 17/30256; G06F 17/30268; G06F 17/3087; G06Q 10/20; G06Q 10/087; G06Q 10/10; H04L 67/18; H04L 67/12; A01D 2101/00; A01D 43/00
USPC .......................................... 382/103
See application file for complete search history.

(56) References Cited

U.S. PATENT DOCUMENTS

2008/0086391 A1*   4/2008   Maynard ............... G06Q 10/00
                                                                  705/28

* cited by examiner

*Primary Examiner* — Amandeep Saini
(74) *Attorney, Agent, or Firm* — Benjamin Aaron Adler

(57) ABSTRACT

There is provided herein an apparatus and method for roadside asset tracking and maintenance monitoring having a mobile unit with data capture devices for capturing roadside asset imagery, global positioning system (GPS) receivers and data interfaces for communicating with an asset management server. As such, the apparatus may take roadside imagery for automated asset identification which may include utilising an asset type image recognition technique for automating the identification of the roadside assets.

19 Claims, 7 Drawing Sheets

(51) Int. Cl.
*G06F 16/9537* (2019.01)
*A01D 101/00* (2006.01)

SYSTEM, SERVER AND DATA CAPTURE DEVICE FOR ROADSIDE ASSET TRACKING AND MAINTENANCE MONITORING

FIELD OF THE INVENTION

The present invention relates in particular, but not necessarily entirely, to a system, server and data capture device for roadside asset tracking and maintenance monitoring.

BACKGROUND

Roadside assets, such as public infrastructure assets, such as speed management posts, reflector posts, roadside barriers and the like are installed and subsequently repaired and maintained over long periods of time.

Now, D1 (US 20080086391 A1—MAYNARD), being exemplary of the current state of the art, discloses a system for impromptu asset tracking for maintenance scheduling. Specifically, D1 refers to the tracking of movable asset types such as graders, levelers, dozers, saws, debris transportation vehicles, diggers, pavers, concrete trucks, supply trucks, cranes, tools, service trucks, compressors and so on and describes examples of the system used in the construction industry (specifically building a shopping mall) for monitoring asset maintenance and unauthorised use of such assets.

For example, D1, in paragraphs 481-482 refers to a reporting device that is mounted to a moveable asset so as to record characteristics of the moveable asset such as by, for example, recording the position of the moveable asset, and having a diagnostic evaluator such as a mileage indicator, a speedometer, a tachometer, an oil pressure indicator, a wheel pressure indicator, a hydraulic indicator, an engine time monitor, and the like to monitor and diagnose the asset so as to be able to schedule maintenance and detect unauthorised use of the moveable asset.

As such, D1 is not suited for fixed roadside asset. In this regard, for roadside assets, councils often times have poor documentation of such roadside asset installations and may therefore not have information relating to the specific location, type, condition and value of each roadside asset.

As such, it would be advantageous to have the ability to identify roadside asset installations.

In this regard, the best D1 offers in terms of identifying (moveable) assets is by scanning a barcode, or inputting a chassis VIN number or the like (see paragraph 488 of D1).

However, D1 is not suited for identifying roadside assets because roadside assets do not uniformly comprise such barcodes, VIN numbers and the like.

As such, it would be advantageous to have the ability to automate the identification of roadside assets in a manner that does not rely on barcodes and the like.

Furthermore, councils may not be aware of roadside assets that have been removed and require replacement or that have been damaged and require maintenance.

As such, it would be advantageous to have the ability to automate the detection of missing roadside assets.

Furthermore, if an asset is to be replaced, such as a speed limit management post, the specific speed limit management post may require installation at a particular location adjacent the road and specify a particular speed. In this manner, the council may not know the previously utilised specific location or the specific speed limit displayed by the speed limit management post. As such, were the speed limit management post replaced, it may be installed in the incorrect location, or with the incorrect speed limit.

As such, it would be advantageous to have a historical record of installed roadside assets, including their characteristics, such as, for example for speed management signs, their locations, their respective speed limits and the like.

Furthermore, councils have no quality control mechanisms for roadside maintenance, such as verge grass cutting other than manual inspections. For example, at least five times a year, the council may deploy grass cutters to cut grass adjacent roads which may involve multiple cutters at differing times. However, councils are unable to control the quality of the grass cutting, such as whether the grass has been cut, whether the grass has been cut to the correct height, whether the grass has been cut sufficiently proximate roadside assets and the like. Indeed, the only mechanism for councils to ensure quality is by way of manual inspection which is not feasible.

As such, it would be advantageous to have means for monitoring the quality of roadside maintenance.

Furthermore, many councils across Australia are experiencing a backlog of infrastructure renewal and there have been recommendations for the funding of asset management programs for councils. In this regard, councils need to allocate funding for roadside asset maintenance so as to request funding from the federal government, allocate rates and the like. However, councils often times do not know the extent of their asset inventory, or the value of the assets of their inventory. In this manner, councils cannot accurately calculate depreciation costs, replacement costs and the like.

D2 (US 20080086391 A1—MAYNARD) discloses a system that receives fixed asset data and then predicts a maintenance plan based on various statistical factors, such as weather, asset type failure rates and the like.

As such, D2 fails to offer the above described advantages of the ability to identify roadside asset installations, the ability to automate the identification of roadside assets in a manner that does not rely on barcodes and the like, the ability to automate the detection of missing roadside assets, the ability to have a historical record of installed roadside assets, including their characteristics, such as, for example for speed management signs, their locations, their respective speed limits and the like.

It is to be understood that, if any prior art information is referred to herein, such reference does not constitute an admission that the information forms part of the common general knowledge in the art, in Australia or any other country.

SUMMARY OF THE DISCLOSURE

The present invention seeks to provide a method, system, server and data capture device for roadside asset tracking and maintenance monitoring, which will overcome or substantially ameliorate at least some of the deficiencies of the above prior art, or to at least provide an alternative. Specifically, in embodiments as will be described in further detail below, there is described an asset and maintenance tracking system which may be deployed on roadside maintenance vehicles, such as grass cutters, to record roadside assets, such as traffic management post, reflector posts and the like, subsequently monitor the previously recorded assets, and to monitor the maintenance conducted by the roadside maintenance vehicle.

Specifically, in accordance with particular embodiments and the exemplary application of roadside grass cutting, the system may be run in "Set-up" mode such that each roadside management post that is slashed is recorded, coded and labelled on a map. A image of the asset is taken at the time of grass cutting that is stored for reference should it need to be specifically identified.

Furthermore, the system may perform asset identification and valuation wherein once data is entered, the system will provide a data analysis option where each asset image is analysed for type, condition and valuation at the time of entry. Any asset needing attention will be flagged and given a liability risk rating.

The system may also allow for real-time tracking of maintenance machinery enabling real-time feedback of the progress of the roadside maintenance. A GPS tracking system allows councils and supervisors to see the location of the grass cutting maintenance machinery on a map and provide more information such as the operator of the machinery.

The system may be further adapted to provide a photographic summary of each maintenance job wherein front and rear mounted cameras will be capable of time incremented photographs showing each maintenance run's works as executed (WAE) and work in progress (WIP). A time-lapse video of these photos will give supervisors an overview of each job, data for quality control and efficiency reviews as well as contract compliance data.

The system may further allow for accumulative data wherein the system will create a log for each maintenance run that will provide useful information that can be used for future statistical analysis and budgeting forecasts.

The system may further allow for real-time incident reporting wherein any incidents encountered in the maintenance run will be recorded and flagged for council or a supervisor's attention immediately reducing the risk of escalation of any incidents.

The system may further allow for collaborative data wherein data from multiple councils can be collected and compared. This will encourage an increase in efficiency, best practice, budget comparison and provide comparative statistics.

With the foregoing in mind, according to one aspect, there is provided method for roadside asset tracking and maintenance monitoring, the method comprising: periodically deploying a mobile unit alongside a roadside section, the mobile unit comprising a data capture device comprising: an asset data capture device operably coupled to at least one digital camera configured for capturing roadside asset image data; a global positioning system (GPS) receiver; and a data interface for communicating with an asset management server, the server comprising an asset tracking register database; receiving the roadside asset image data representing images taken of a plurality of roadside assets; receiving location data from the GPS receiver representing the respective locations the roadside assets; utilising an asset type image recognition technique for automating the identification of the roadside assets; comparing roadside asset data of the asset tracking register database to: record newly identified roadside assets and their respective locations in the asset tracking register database; and identify missing roadside assets.

The asset type image recognition technique may comprise an image recognition stage comprising edge shape detection.

The edge shape detection may comprise rotation invariance processing to allow for edge shape detection of skew roadsign assets.

Edge shape detection may comprise comparison to reference shapes in a shape reference database.

The image recognition may comprise an image recognition stage comprising colour detection.

The colour detection may comprise colour juxtapose detection.

Colour detection may comprise comparison to reference colours in a colour reference database.

The image recognition may comprise an image recognition stage comprising symbol detection.

Symbol detection may comprise comparison to reference symbols in a symbol reference database.

Symbol detection may comprise alphanumeric symbol detection.

Symbol detection may comprise text recognition.

The mobile unit may further comprise an asset proximity detector for detecting the proximity of roadside assets and the asset data capture device may be triggered by the asset proximity detector.

The mobile unit may comprise a grass cutter unit and the proximity detector may be configured for detecting when the roadside asset may be engaged by the grass cutter unit.

The mobile unit may comprise a grass cutter unit and the grass cutter unit may be controllable to be moveable with respect to the mobile unit and the at least one digital camera may be configured to follow the movement of the grass cutter unit.

The method may further comprise image comparison for detecting roadside asset damage or degradation to identify assets requiring maintenance.

The image comparison may comprise colour comparison.

The image comparison may comprise shape comparison.

The image comparison may comprise colour detection.

The image comparison may comprise symbol comparison.

The method may further comprise generating a map representation representing the roadside section and the locations of the identified roadside assets along the roadside section.

The mobile unit may comprise at least one camera for capturing image data from the perspective of the mobile unit and the map representation may be configured for selectively displaying image data from the at least one camera at a plurality of locations along the roadside section.

The mobile unit may comprise forward and rearward facing cameras for respectively capturing forward and rearward facing image data from the perspective of the mobile unit and the map representation may be configured for displaying before and after maintenance comparison imagery utilising the image data received from the forward and rearward facing cameras.

The method may further comprise calculating a valuation for the roadside assets, the valuation calculated in accordance with the asset type identified using the asset type image recognition technique.

The valuation may be further calculated in accordance with entry dates associated with each of the asset types.

The method may further comprise using an asset condition estimate image recognition technique to estimate a condition of each of the roadside assets and the valuation may be further calculated in accordance with the estimated condition.

The method may further comprise calculating maintenance statistics including at least one of last maintenance date, distance of the roadside section and average time to maintain the roadside section.

The method may further comprise the mobile unit receiving, via the data interface, maintenance instruction data comprising instructions for the maintenance of the roadside section.

The mobile unit may be configured for sending the asset image data to the server and the service performs the asset type image recognition.

In accordance with other aspects, there is provided a server for roadside asset tracking, the server may comprise a processor for processing digital data; a memory device for storing digital data including computer program code, the memory device being operably coupled to the processor; a network interface adapted for sending and receiving data across a data network, the network interface being operably coupled to the processor; and a database adapted for storing asset data representing a plurality of assets, the asset data may comprise at least unique asset identifier data and asset location data, the database being operably coupled to the processor, wherein, in use, the processor may be controlled by the computer program code to receive, via the network interface, from a remote data capture device, asset data relating to an asset, the asset data may comprise at least location data representing the location of the asset; and insert, into the database, the asset data in association with a unique asset identifier and the location data.

The asset data further may comprise the asset type and wherein the processor may be further controlled by the computer program code to store, in the database, the asset type in association with the unique asset identifier.

The asset data further may comprise additional asset information and wherein the processor may be further controlled by the computer program code to store, in the database, the additional asset information in association with the unique asset identifier.

The processor may be further controlled by the computer program code to select an additional asset information category in accordance with the asset type.

The asset data further may comprise image data and wherein the processor may be further controlled by the computer program code to store, in the database, the image data in association with the unique asset identifier.

The processor may be further controlled by the computer program code to store, in the database, valuation data representing a valuation of the asset in association with the unique asset identifier.

The processor may be further controlled by the computer program code to calculate the valuation.

The processor may be further controlled by the computer program code to calculate the valuation in accordance with an asset type.

The processor may be further controlled by the computer program code to calculate the valuation in accordance with an asset lifespan allocated for the asset type.

The processor may be further controlled by the computer program code to calculate the valuation in accordance with a depreciation schedule for the asset type.

The processor may be further controlled by the computer program code to select, from the database, previously recorded asset data representing a plurality of previously recorded assets; compare the asset data against the previously recorded asset data; and identify at least one missing asset in accordance with the previously recorded asset data and the asset data.

The processor may be further controlled by the computer program code to select, from the database, previously recorded asset data representing the asset; compare the asset data against the previously recorded asset data; and identify the asset as requiring maintenance in accordance with the asset data and the previously recorded asset data.

The previously recorded asset data may comprise previously recorded image data representing a previous image of the asset and the asset data may comprise present image data representing a previous image of the asset and wherein, in identifying the asset as requiring maintenance, the processor may be further controlled by the computer program code to compare the previously recorded image data and the present image data.

The processor may be further controlled by the computer program code to generate map representation data, the map representation data may comprise a representation of the asset represented at an appropriate location of the asset.

The database may be further adapted to store maintenance task data representing various maintenance tasks allocated to various maintenance machinery for various maintenance routes and wherein, in use, the processor may be further controlled by the computer program code to receive, via a network interface, from the remote data capture device, maintenance data relating to a maintenance task being performed by maintenance machinery may comprise the remote data capture device; and store, in the database, the maintenance data in relation to maintenance machinery identification data identifying the maintenance machinery and read identification data representing the maintenance route.

The maintenance data may comprise the location of a maintenance machinery.

The maintenance data may comprise maintenance image data.

The maintenance image data may comprise maintenance image data representing a rearward image from the maintenance vehicle.

The maintenance image data may comprise maintenance image data representing a forward image from the maintenance vehicle.

In use, the processor may be further controlled by the computer program code to calculate at least one maintenance statistic in accordance with at least one of the maintenance data and the asset data.

The at least one maintenance statistic may comprise at least one of route number uniquely representing, total number of assets for the route, total value of assets for the route, the last maintenance date of the route, the distance of the route, the average time to maintain the route and the maintenance cost per kilometre for the route.

In use, the processor may be further controlled by the computer program code to send, via the network interface, to the remote data capture device, maintenance instruction data.

According to yet another aspect, there is provided a data capture device for roadside asset tracking, the data capture device may comprise a processor for processing digital data; a memory device for storing digital data including computer program code, the memory device being operably coupled to the processor; a location sensor adapted to sense a location of the data capture device, the location sensor being operably coupled to the processor; an asset data receiver adapted to receive asset data; and a wireless network interface adapted for sending and receiving data across a wireless data network, the network interface being operably coupled to the processor, wherein, in use, the processor may be controlled by the computer program code to receive, from the asset data receiver, asset data relating to an asset; receive, from the location sensor location data representing the location of the data capture device; and send, via the network interface, to an asset tracking server, the asset data, the asset data may comprise the location data.

The asset data receiver may comprise an image capture device and wherein, in use, the asset data may comprise image data representing an image of the asset.

The image capture device may be a forward facing image capture device.

The image capture device may be a rearward facing image capture device.

The image capture device may comprise both a forward facing image capture device and a rearward image capture device and wherein, in use, the processor may be controlled by the computer program code to capture forward view image data representing a forward view of the asset; and subsequently capture rearward view image data representing a rearward view of the asset.

The processor may be further controlled by the computer program code to identify the asset in accordance with the image data.

The processor may be further controlled by the computer program code to identify the asset in accordance with an image recognition technique.

The image recognition technique may comprise an image comparison technique with a plurality of asset type images.

The processor may be further controlled by the computer program code to capture the image data upon receipt of a trigger signal.

The asset data input may comprise an asset detector adapted to generate the trigger signal.

The asset detector may be a physical asset detector.

The asset detector may be a noncontact asset detector.

The noncontact asset detector may comprise light beam interrupt detector.

The noncontact asset detector may comprise an ultrasonic proximity detector.

The asset data input device may comprise a scanning device adapted to scan the asset data from a data bearing computer readable medium.

The data bearing computer readable medium may comprise a barcode.

The barcode may comprise at least one of a 2-D and 3-D barcode.

The data bearing computer readable medium may comprise a near field radio frequency tag.

The asset data input device may comprise a human interface device adapted to receive at least a subset of the asset data.

It should be noted that while the embodiments described herein are described with reference to tracking roadside assets and maintaining roadsides, the embodiments described herein need not necessarily be limited to these particular applications and the embodiments may be applicable to other applications also, including non-roadside located assets and maintenance, such as for, for example, the tracking and maintenance of trees within an orchard and the like.

Other aspects of the invention are also disclosed.

BRIEF DESCRIPTION OF THE DRAWINGS

Notwithstanding any other forms which may fall within the scope of the present invention, a preferred embodiments of the disclosure will now be described, by way of example only, with reference to the accompanying drawings in which.

DESCRIPTION OF EMBODIMENTS

Figure 1:
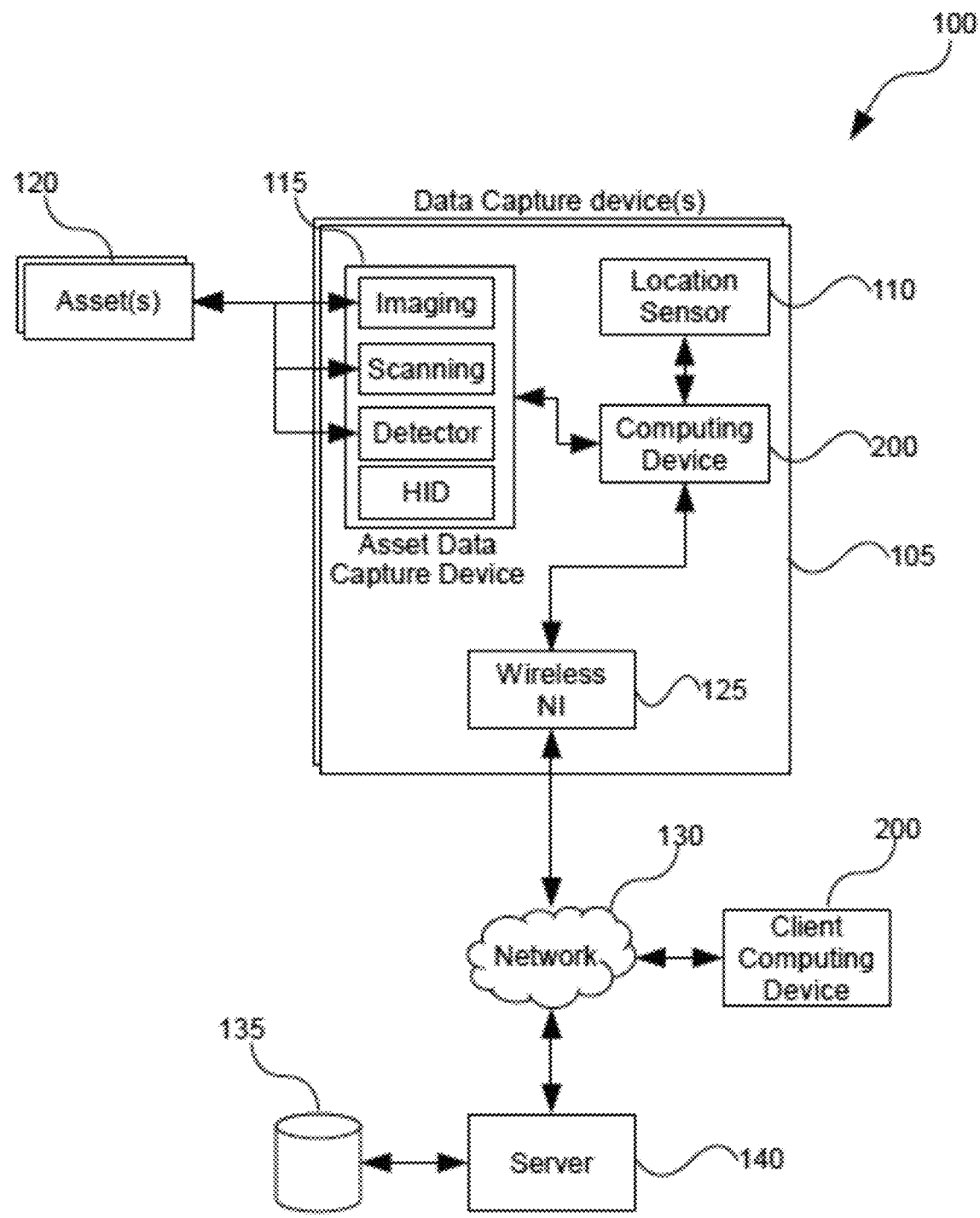
FIG. 1 shows a system for roadside asset tracking in accordance with an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the system, server and data capture device for roadside asset tracking and maintenance monitoring are disclosed and described, it is to be understood that this disclosure is not limited to the particular configurations, process steps, and the like disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

A System for Asset Tracking

Turning now to FIG. 1, there is shown a system 100 for roadside asset tracking.

The system 100 comprises at least one data capture device 105 operably coupled to a server computing device 140 across a data network 130. In this manner, the data capture device 105 is adapted to record information relating to various roadside assets and convey the asset data to the server 140 for recordal. Operably coupled to the server 140 is a database 135 adapted for storing asset and maintenance data.

The asset data may comprises asset type and location data representing a plurality of assets and their respective locations. Over and above this, the database 135 may store additional asset data as will be described in further detail below, such as asset image data, asset valuation data and the like.

The maintenance data may comprise maintenance data relating to particular maintenance routes, the maintenance route distances, maintenance machinery and operators allocated to maintenance jobs and image data being a record of maintenance performed for maintenance quality control purposes as will be described in further detail below.

The data capture device 105 comprises a wireless network interface 125 for sending and receiving data across the network 130. The wireless network interface 125 is ideally suited for use by roadside maintenance machinery, such as grass cutting devices as will be described in further detail below, and should therefore be able to send and receive data across several kilometres. In this manner, in one embodiment, the network interface 125 is a GSM interface adapted to send and receive data across a GSM data network, such as a 3G, 4G data network or the like.

It should be noted that in certain embodiments, as opposed to the data capture device comprising a wireless network interface 125 for sending the asset data to the server 140, in other embodiments, the data capture device 105 comprises a local database adapted for storing the asset data. In this manner, upon completion of an asset tracking run or maintenance job, the data from the local database may be retrieved such as by way of USB memory stick or the like for uploading to the server 140 or other computing device.

Operably coupled to the wireless network interface 125 is a computing device 200 as will be described in further detail below, especially with reference to FIG. 2.

The computing device 200 is adapted to receive asset data and send the asset data to the server 140 across the network 130.

As such, operably coupled to the computing device 200 is an asset data input device 115 adapted to receive asset data relating to a plurality of assets. As can be appreciated, there are a number of manners in which asset data relating to a plurality of assets may be input into the data capture device. These different manners will be described in further detail below, but for brief introductory purposes, in embodiments, the asset data input device 115 may comprise an imaging device, such as a camera or the like adapted to capture images of various assets. These images of the assets may be then manually classified by operators, or alternatively utilised for automated image recognition purposes for identifying assets.

Furthermore, the asset data input device 150 may comprise a scanning device adapted to scan a computer readable media attached to the asset, such as a barcode, near field communication tag and the like.

Yet further, the asset data input device 150 may comprise an asset proximity detector adapted for use in the below mentioned embodiment where the data capture device 105 is used in conjunction with a grass cutting device comprising an asset engagement. In this manner, the asset engagement may comprise an asset detector, such as a deflecting lever, light beam interrupt or the like adapted to sense the presence of the asset engaged by the asset engagement.

Yet further, the asset data input 150 may comprise a human input device, such as a keyboard and the like allowing a human operator to manually input asset data relating to an asset.

The data capture device 155 may further comprise a display device (not shown) adapted for displaying digital data, especially the exemplary graphical user interfaces provided below with reference to FIGS. 5 and 6.

Furthermore, the system 100 may comprise a client computing device 200 operably coupled to the server 140 and/or the data capture device 105 to perform various administrative functionality, including by way of exemplary graphical user interface provided below with reference to FIG. 7.

A Computing Device 200

Figure 2:
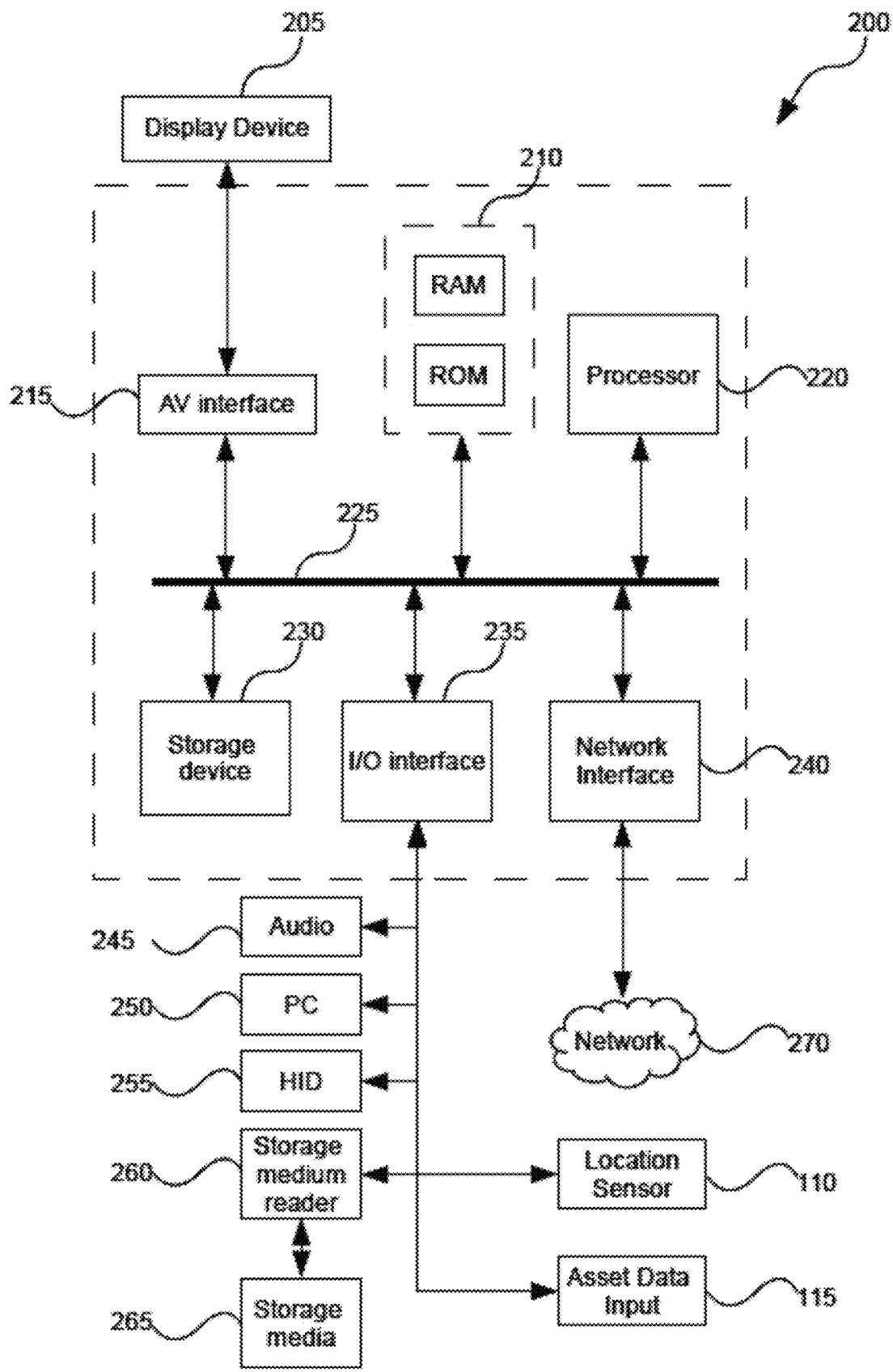
FIG. 2 shows a computing device for application in the system of FIG. 1 in accordance with an embodiment of the present disclosure.

Turning now to FIG. 2, there is shown a computing device 200 adapted for being implemented as any of the computing devices as substantially provided in FIG. 1. Specifically, the computing device 200 may be adapted to perform the functionality performed by the server 140, data capture device 105 or administrative client computing device 200.

In particular the computer implemented functionality for asset tracking and maintenance monitoring, as described herein, may be implemented as computer program code instructions executable by the computing device 200. The computer program code instructions may be divided into one or more computer program code instruction libraries, such as dynamic link libraries (DLL), wherein each of the libraries performs a one or more steps of the method. Additionally, a subset of the one or more of the libraries may perform graphical user interface tasks relating to the steps of the method.

The device 200 comprises semiconductor memory 210 comprising volatile memory such as random access memory (RAM) or read only memory (ROM). The memory 210 may comprise either RAM or ROM or a combination of RAM and ROM.

The device 200 comprises a computer program code storage medium reader 260 for reading the computer program code instructions from computer program code storage media to 65. The storage media to 65 may be optical media such as CD-ROM disks, magnetic media such as floppy disks and tape cassettes or flash media such as USB memory sticks.

The device further comprises I/O interface 235 for communicating with one or more peripheral devices. The I/O interface 235 may offer both serial and parallel interface connectivity. For example, the I/O interface 235 may comprise a Small Computer System Interface (SCSI), Universal Serial Bus (USB) or similar I/O interface for interfacing with the storage medium reader 260. The I/O interface 235 may also communicate with one or more human input devices (HID) 255 such as keyboards, pointing devices, joysticks and the like. The I/O interface 235 may also comprise a computer to computer interface, such as a Recommended Standard 232 (RS-232) interface, for interfacing the device 200 with one or more personal computer (PC) devices 250. The I/O interface 235 may also comprise an audio interface for communicate audio signals to one or more audio devices 245, such as a speaker or a buzzer.

The device 200 also comprises a network interface 240 for communicating with one or more computer networks 270. The network 270 may be a wired network, such as a wired Ethernet' network or a wireless network, such as a Bluetooth™ network, IEEE 802.11, cellular data network network or the like. The network 280 may be a local area network (LAN), such as a home or office computer network, or a wide area network (WAN), such as the Internet or private WAN.

The device 200 comprises an arithmetic logic unit or processor 220 for performing the computer program code instructions. The processor 220 may be a reduced instruction set computer (RISC) or complex instruction set computer (CISC) processor or the like. The device 200 further comprises a storage device 230, such as a magnetic disk hard drive or a solid state disk drive.

Computer program code instructions may be loaded into the storage device 230 from the storage media 265 using the storage medium reader 260 or from the network 270 using network interface 240. During the bootstrap phase, an operating system and one or more software applications are loaded from the storage device 230 into the memory 210. During the fetch-decode-execute cycle, the processor 220 fetches computer program code instructions from memory 210, decodes the instructions into machine code, executes the instructions and stores one or more intermediate results in memory 210.

In this manner, the instructions stored in the memory 210, when retrieved and executed by the processor 220, may configure the computing device 200 as a special-purpose machine that may perform the functions described herein.

The device 200 also comprises a video interface 215 for conveying video signals to a display device 205, such as a liquid crystal display (LCD), cathode-ray tube (CRT) or similar display device.

The device 200 also comprises a communication bus subsystem 225 for interconnecting the various devices described above. The bus subsystem 225 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like.

Maintenance Machinery

As alluded to above, in a preferred embodiment, the data capture device 105 is adapted for utilisation of conjunction with maintenance machinery.

Figure 3:
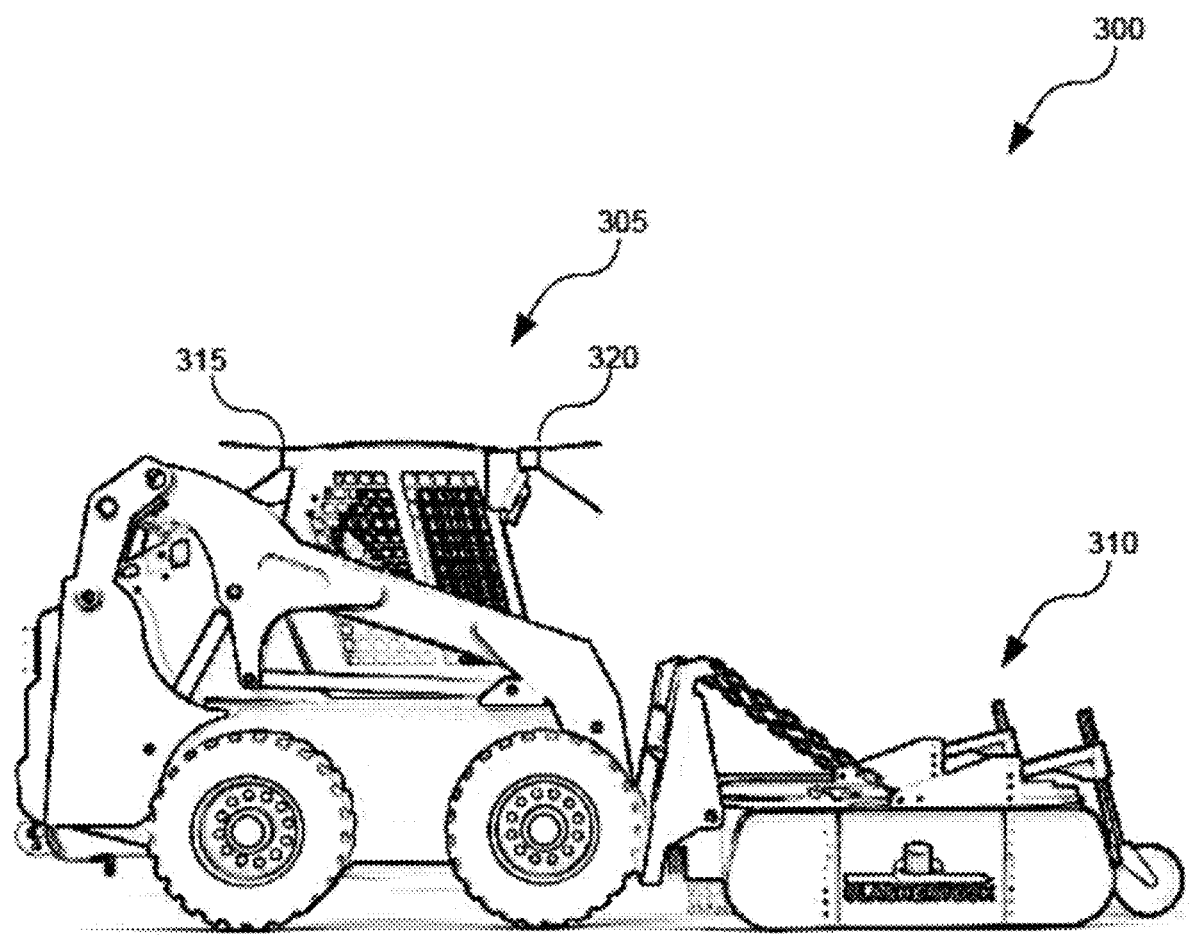
FIG. 3 shows maintenance machinery comprising a data capture device in accordance with an embodiment of the present disclosure.

Specifically, referring to FIG. 3, there is shown one version of maintenance machinery 300 comprising a maintenance vehicle 305 and a grass slasher 310.

The maintenance machinery 300 may comprise maintenance machinery as is disclosed in respect of patent application PCT/AU2014/050437 in the name of the present Applicant, the entire contents of which are incorporated herein by reference.

The maintenance vehicle 305, being a bobcat, tractor or other similar vehicle is adapted to move the grass slasher 310 along roadsides for grass cutting purposes. While performing the maintenance, by providing the maintenance machinery 300 with the data capture device 105, the roadside assets may be advantageously simultaneously recorded and maintained and the maintenance performed by the maintenance machinery 300 may be recorded for subsequent quality control verification purposes.

Figure 4:
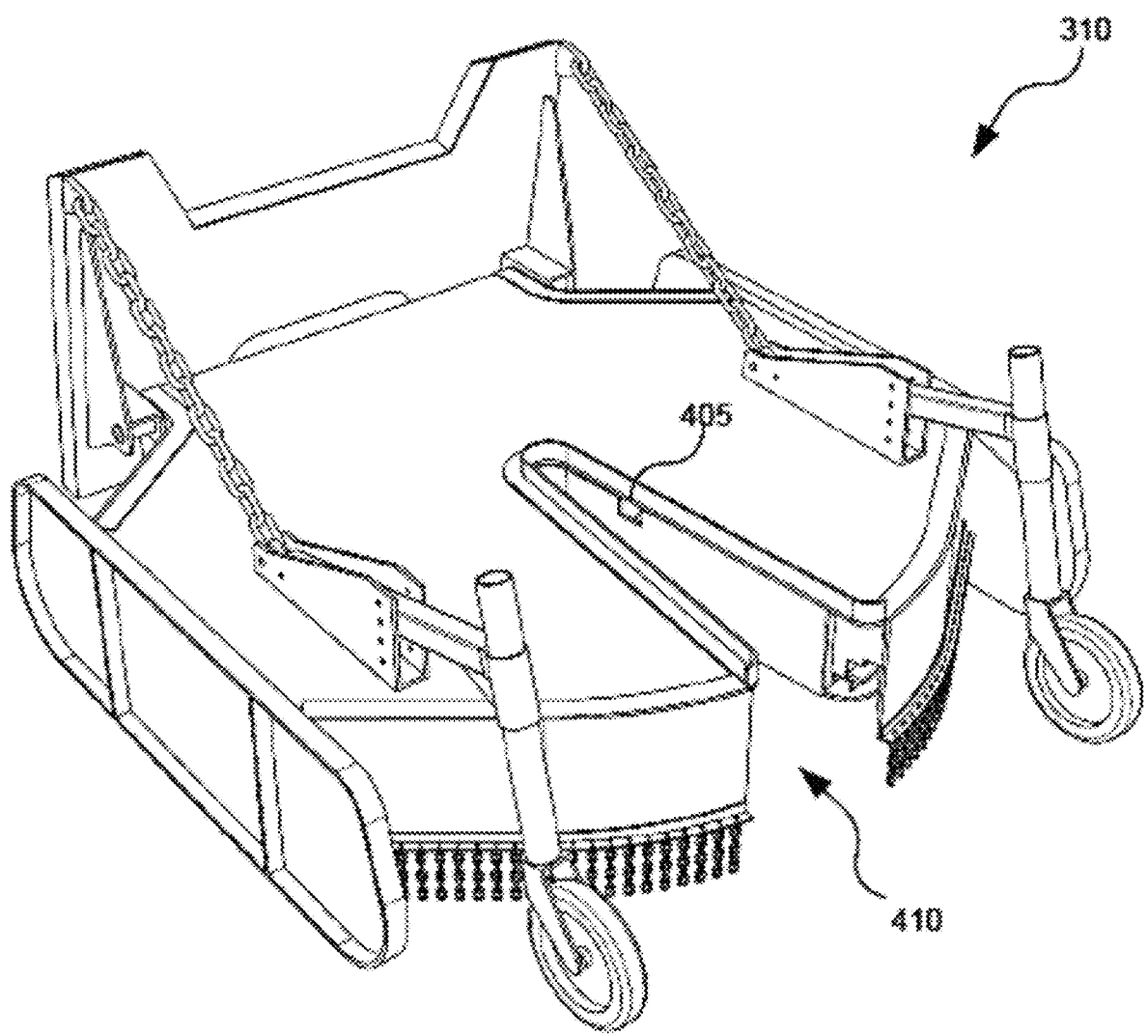
FIG. 4 shows a grass cutting device of the maintenance machinery of FIG. 3 in accordance with an embodiment of the present disclosure.

Further specifically, referring to FIG. 4, there is shown a perspective view of the grass slasher 310 in further detail. In this particular embodiment, the grass slasher 310 comprises an asset engagement 310 or dock adapted to engage a roadside asset, such as a traffic control signage post or the like so as to be able to cut about the signage post.

In this manner, the asset engagement 310 may comprise the above-mentioned asset detector adapted to detect the proximity of the post so as to be able to record asset data.

Exemplary Embodiments

Having described the above system architecture, there will now be described various exemplary embodiments for illustrative purposes, including describing the functions performed by the server 140 and data capture device 105. It should be noted that these embodiments are exemplary only and that no limitation should necessarily be imputed to the embodiments described herein other than those specifically enumerated in the claims.

In these exemplary embodiments, there will be described the utilisation of the maintenance machinery 300 as substantially provided in FIGS. 3 and 4 for tracking roadside assets during the grass cutting process. However, again, this application is exemplary only and the system 100 may be equally applicable for provision in other applications, including applications not necessarily comprising maintenance machinery and not necessarily for assets located along roadsides.

Server Functionality

Now with this exemplary application in mind, there will now be described the functionality performed by the server 140. Specifically, in this embodiment, the server 140 comprises a processor 220 for processing digital data, a memory device 210 for storing digital data including computer program code, the memory device 210 been operably coupled to the processor 220. Furthermore, the server 120 comprises a network interface adapted for sending and receiving data across the data network 130, the network interface been operably coupled to the processor 220. Furthermore, the server 140 comprises a database interface for interfacing with the database 135. In this regard, the database is adapted for storing asset data representing a plurality of assets wherein the asset data comprises at least a unique asset identifier data and asset location data. The database interface is similarly operably coupled to the processor 220.

Server Functionality—Data Recorded

Now, in use, the server 140 is adapted to receive, from the data capture device 105 asset data relating to a roadside asset, the asset data comprising at least the location of the roadside asset. In this manner, the server 140 is adapted to store, in the database 135, asset type and location data representing the asset and the location thereof.

For example, during the grass cutting process, should the maintenance vehicle 300 come across and 80 km an hour speed signage post, the data capture device 105 would send asset data relating to the speed signage post and the location thereof, as ascertained from the location sensor 110, to the server 140.

In this manner, the server 140 may record the location of the speed signage post. If the speed signage post has not yet been recorded in the database 135, the server 140 may create an entry for the speed signage post.

Now, further information may be provided by the data capture device 105 to the server 140.

In one embodiment, the server 140 may further be adapted to receive, from the data capture device 105, the asset type. For example, for the above-mentioned speed signage post, the speed signage post asset type may be allocated. Other asset types may include, for example, informational street signage, warning street signage, and other asset types not specifically related to signage, such as roadside barriers, speed bumps, cattle grids, water fountains, side roads and the like.

A further embodiment, the server 140 may be adapted to store additional information in relation to the asset type. For example, for the speed signage asset type, the speed may be recorded, such as 80 km per hour. In this manner, should the particular street sign require replacement, the appropriate speed signage of the replacement speed sign may be ascertained from the database 135.

Other additional information may include the condition of the roadside asset, such as a rating of 1 to 10.

In this embodiment, the system 100 may be configured for differing additional information according to differing asset types. In this manner, the system 100 may record or prompt for input the appropriate additional information as required for the particular asset type.

In one preferred embodiment, the server 140 is adapted to receive, from the data capture device 105 image data relating to a particular asset for storage within the database 135.

Specifically, the asset data input 115, as will be described in further detail below, in one embodiment may comprise an imaging device such as a camera or the like. In this manner, upon recordal of an asset by the data capture device 105, an image of the asset may be captured using the camera. In this manner, image data may be stored for each asset recorded within the database 135, for subsequent visual inspection and other purposes.

In embodiments, as will be described in further detail below, the system 100 may be adapted for the automated identification of assets using image recognition technique performed on the image data.

In yet further embodiments, the system 100 may be adapted to allocate a monetary valuation for each asset. In this manner, during the asset recording process, a monetary valuation of the asset inventory may be ascertained from the server 140 which may serve various purposes, including for funding for maintenance and the like.

In this embodiment, the server 140 may be adapted to apply a depreciation schedule against assets so as to account for depreciation over time. Furthermore, the server 140 may be further configured with a service life for each type of asset for asset replacement purposes.

In this embodiment, the server 140 may be adapted to select the appropriate depreciation schedule and/or service life in accordance with the appropriate asset type. For example, speed control signage may depreciate faster and have a shorter service life as opposed to a roadside barrier, for example.

Server Functionality—Identifying Missing Assets

In one particular preferred embodiment, the server 140 is adapted to identify missing assets, such as, for example, in the event of a particular roadside speed control signage having been removed or dislocated from vehicle impact.

For such missing asset identification, the functionality performed by the server 140 usually comprises a first pass wherein particular assets are recorded for the first time. For example, for a particular section of road, the maintenance vehicle 300 may be sent to capture the above-mentioned assets data relating to the roadside assets for the roadside section for the first time.

As such, upon subsequent passes, the server 140 is adapted to identify whether any of the previously recorded assets failed to be recorded.

For example, for a second pass, the data capture device 105 may report, to the server 140, a previously recorded 80 km/h speed control sign but fail to report a previously recorded 110 km/h speed control sign. In this manner, the server 140 would be adapted to identify the omitted 110 km/h speed control sign and take appropriate action. Such appropriate action may include notifying the operator of the maintenance machinery 300 accordingly such that the operator may acknowledge that the speed control sign is indeed missing or alternatively rectify an omission.

Furthermore, the server 140 may compile a database of missing roadside assets such that maintenance crews may be scheduled and deployed accordingly.

In embodiments as will be described in further detail below, the exemplary graphical user interfaces as may be displayed by the data capture device 105 as will be described with reference to FIGS. 5 and 6 may display upcoming assets on a map representation of the like representing previously recorded roadside assets. In this manner, the roadside operator would know in advance of approaching roadside assets, or where previously recorded roadside assets should be.

In embodiments, as opposed to the system 100 identifying missing assets, the operator, or the data capture device 105 in an automated manner, may identify assets requiring replacement. For the operator initiated flagging of assets requiring maintenance, should the operator notice a particular asset is damaged, such as having been blackened from bushfire or the like, the operator may flag the particular asset, such as by using the human interface device of the asset data input 115 to flag that the particular assets requires maintenance. In other embodiments, the data capture device 105, especially by utilising image recognition technique may identify assets requiring maintenance, such as wherein image data recorded from an asset deviates from a standard asset image, such as wherein a street sign is blackened, bent, obliquely orientated or the like.

Server Functionality—Generating Map Data

In an embodiment, the server 140 is adapted to generate map data for management purposes. In particular, the map data may be displayed by the display device of the client computing device 200, especially with reference to the exemplary graphical user interface as will be described in further detail below with reference to FIG. 7.

In this manner, administrators, such as councils and the like may view map representations having superimpose thereon the location of various assets, such as by way of appropriate icon or the like. In embodiments, the icon type may represent the asset type and furthermore, each icon may be user selectable to display further information in relation to the asset, such as by displaying the image data for the asset, the additional information recorded for the asset and the like.

Server Functionality—Maintenance Tracking

In embodiments, the server 140 is further adapted for maintenance tracking, additionally, or alternative to asset tracking.

For example, grass cutting maintenance may be tracked and managed by the server 140.

For example, road verges may require cutting 5 times a year, including at differing heights depending on whether the grass is seeding or not.

In this manner, various maintenance may be scheduled by the server 140. Thereafter, once the maintenance is in progress by the maintenance machinery 300, the current status of the maintenance may be recorded by the server 140, especially in ascertaining the percentage work completed in accordance with the location of the maintenance machinery 300 as it is received from the data capture device 105.

In this manner, the server 140 may record, for display by the client computing device 200, various statistics relating to various maintenance being performed, or requiring performance. Such statistics may include work to do, work in progress and work performed.

Similarly, by using map representations, the client computing device 200 may be adapted to display map representations showing the locations of various maintenance machinery 300, their respective work routes, work completed and the like.

In embodiments, and referring to FIG. 3, the maintenance machinery 300 may comprise a forward facing camera 320 and a rearward facing camera 315. In this manner, at periodic intervals, the server 140 may be adapted to receive, from the data capture device 105 image data from these cameras such that an administrator, utilising the client computing device 200 may be adapted to view the forward view and the rearward view of the maintenance machinery 300 so as to be able to ascertain the quality of the work performed, for example. It should be noted that in embodiment, the maintenance machinery 300 may comprise either the forward facing camera 320 or the rearward facing camera 315 in lieu of having both.

In these embodiments, the server 140 may be adapted to send maintenance instructions to the data capture device 200. Such maintenance instructions may include, for example, the appropriate height at which to cut the grass. In this example, the operator, viewing the display device of the data capture device 105 may view the required grass height and set the grass cutter 310 height accordingly.

Data Capture Device Functionality

Having described the exemplary functionality is performed by the server 140, there will now be described exemplary functionality performed by the data capture device 105 in accordance with the exemplary embodiment of using maintenance machinery 300 for grass cutting purposes in conjunction with the data capture device 105 for recording asset data relating to various roadside assets and monitoring the maintenance performed during the grass cutting process.

As alluded to above, the data capture device 105 similarly comprises a processor 220 for processing digital data, a memory device 210 for storing digital data including computer program code, the memory device 210 being operably coupled to the processor 220.

Furthermore, the data capture device 105 comprises a location sensor 110 for sensing a location of the data capture device, the location sensor being operably coupled to the processor 220. In embodiments, the location sensor 110 may comprise a GPS receiver.

Furthermore, the data capture device 105 comprises an asset data receiver 105 adapted for receiving asset data relating to various assets including in the manners described in further detail below.

Furthermore, the data capture device 105 comprises a wireless network interface adapted for sending and receiving data across a wireless data network 130 to the server 140. As alluded to above, given the remote operational locations of the machinery 300, the wireless network interface 125 may comprise a GSM data interface adapted for sending data across a GSM network.

In a preferred embodiment, the data capture device 105 is a small form factor ruggedised computing device, such as a tablet computing device have an inbuilt location sensing and display functionality, including, in embodiments, image capture functionality. In this embodiment, the data capture device 105 computing device may be utilised in isolation, or alternatively coupled to various other electronic computing devices located about the machinery 300, such as the forward and rearward facing camera is 320, 315, tactile sensors and the like.

In a preferred embodiment, the data capture device 105 is adapted to automate the asset data recording process requiring minimal intervention from the operator of the machinery 300.

Data Capture Device Functionality—Data Sent

As such, in use, as the machinery 300 cuts grass, as the machinery 300 encounters various roadside assets, the data capture device 105 is adapted to receive from the asset data input, asset data relating to the asset and send, via the wireless network interface 125 and the network 130, the asset data to the server 140 for recordal within the database 135.

Additionally, and as alluded to above, in embodiments, the data capture device 105 may be adapted to receive information from the server 140 also, including information relating to previously recorded assets, maintenance instructions and the like.

Data Capture Device Functionality—Imaging

Now, there will be described a first aspect of the asset data input 115 wherein the asset data input 115 utilises imaging for the purposes of recording asset data.

In this embodiment, and as alluded to above, the machinery 300 may comprise cameras, especially the forward facing camera 320 to record information relating to an asset.

Specifically, the forward facing camera 320 would be appropriately located for an ideal vantage for recording image data relating to various roadside assets. For example, the forward facing camera 320 may be mounted at the forward upper edge of the canopy of the vehicle 305 or alternatively located on the cutting device 310 for example.

In embodiments, the rearward facing camera 315 may be adapted to capture a rearward image of the asset also such that the administrator may be able to view both sides of the asset or view the maintenance that has been performed. In this manner, during operation, the data capture device 105 may be adapted to record a forward facing image of the asset, and subsequently, at the appropriate time, record a rearward image of the asset.

The timing for the taking of the second rearward facing image may be timed in accordance with a predetermined time interval, such as 10 seconds, the speed of the maintenance vehicle 310 or wherein the data capture device 105 captures the second rearward facing image in accordance with the speed of the maintenance vehicle 305, or the location of the maintenance vehicle 310 wherein the data capture device 105 captures the second rearward facing image in accordance with the location of the vehicle, such as wherein the maintenance vehicle 305 is 5 m past the asset.

Now, in one embodiment, the system 100 is adapted for the automated identification of assets in accordance with the image data. In one particular embodiment, the system 100 may employ image recognition for recognising various assets and asset types. It should be noted that the image recognition may be performed by the data capture device 105, or where the data capture device is a low-power computing device, by the more powerful server 140.

In this manner, at intervals, the data capture device 105 may be adapted to capture images from the cameras wherein the images are processed using an image processing technique. For example, should the data capture device 105 capturing image comprising an 80 km an hour street sign, the system 100 may identify the images comprising the Street sign type and of the 80 km an hour additional information for the street sign.

In embodiments, the database 135 may comprise exemplary representative imagery of various roadside assets for comparison purposes during the image recognition technique.

In other embodiments, the capturing of images may be triggered. For example, and especially referring to the embodiment provided in FIG. 4 shown the cutting device 310 in further detail, as can be seen, in this embodiment, the cutting device 310 comprises an asset engagement 410. The asset engagement 410 is adapted to receive the asset therein so as to cut the grass about the asset. During the engagement of the assets by the asset engagement 410, the asset may be detected by the asset detector 405 which may be a tactile asset detector, such as a deflected lever, a light beam interrupted or the like.

As such, upon receiving indication of the detection of an asset by the asset detector, the data capture device 105 may be adapted to capture an image.

It should be noted that other asset detectors may be employed such as by way of ultrasonic proximity detection device adapted to detect assets within proximity of the machinery 300.

Data Capture Device Functionality—Scanning

In other embodiments, the asset data input device 115 may be adapted to read computer readable information from a computer readable data bearing media attached to an asset.

Such computer readable data bearing media may comprise a barcode, such as a 2-D or 3-D barcode, or near field radio frequency communication device and the like.

For example, all roadside assets may be provided with low-cost NFC tags for detection by approximate data capture devices 105 during the grass cutting run.

Data Capture Device Functionality—Asset Detector

In an embodiment, the acetate input 150 may comprise the above-mentioned asset detector adapted to detect an asset. As alluded to above, in one manner, the asset detector may be located about the asset engagement 410 to detect when an asset has been engaged within the asset detector.

However, in embodiments, the asset detector need not necessarily be used in conjunction with an asset engagement and may, for example comprise physical object proximity detectors located about the vehicle 310. For example, the asset detector may comprise ultrasonic proximity detectors adapted to detect objects within proximity of the vehicle 310.

Data Capture Device Functionality—Human Interface Device

In one embodiment, alternatively or additionally, asset data may be recorded by way of a human input device. In one embodiment, the human input device comprises a touch sensitive overlay over the display device of the data capture device comprising inputs allowing the user to input various information.

In embodiments, all of the asset data may be input using the human input device such as wherein the operator of the machinery 300 manually records each asset.

In other embodiments, the asset data may be complimented using the human input device such as wherein, for example, the data capture device 105 detects a speed control road sign wherein the human operator inputs the speed limit of the detected speed control road sign.

Exemplary Graphical User Interfaces

As alluded to above, there will now be described exemplary graphical user interfaces as may be displayed by the display device of the data capture device 105 and the client computing device 200.

Exemplary Graphical User Interfaces—Data Capture Device

Figure 5:
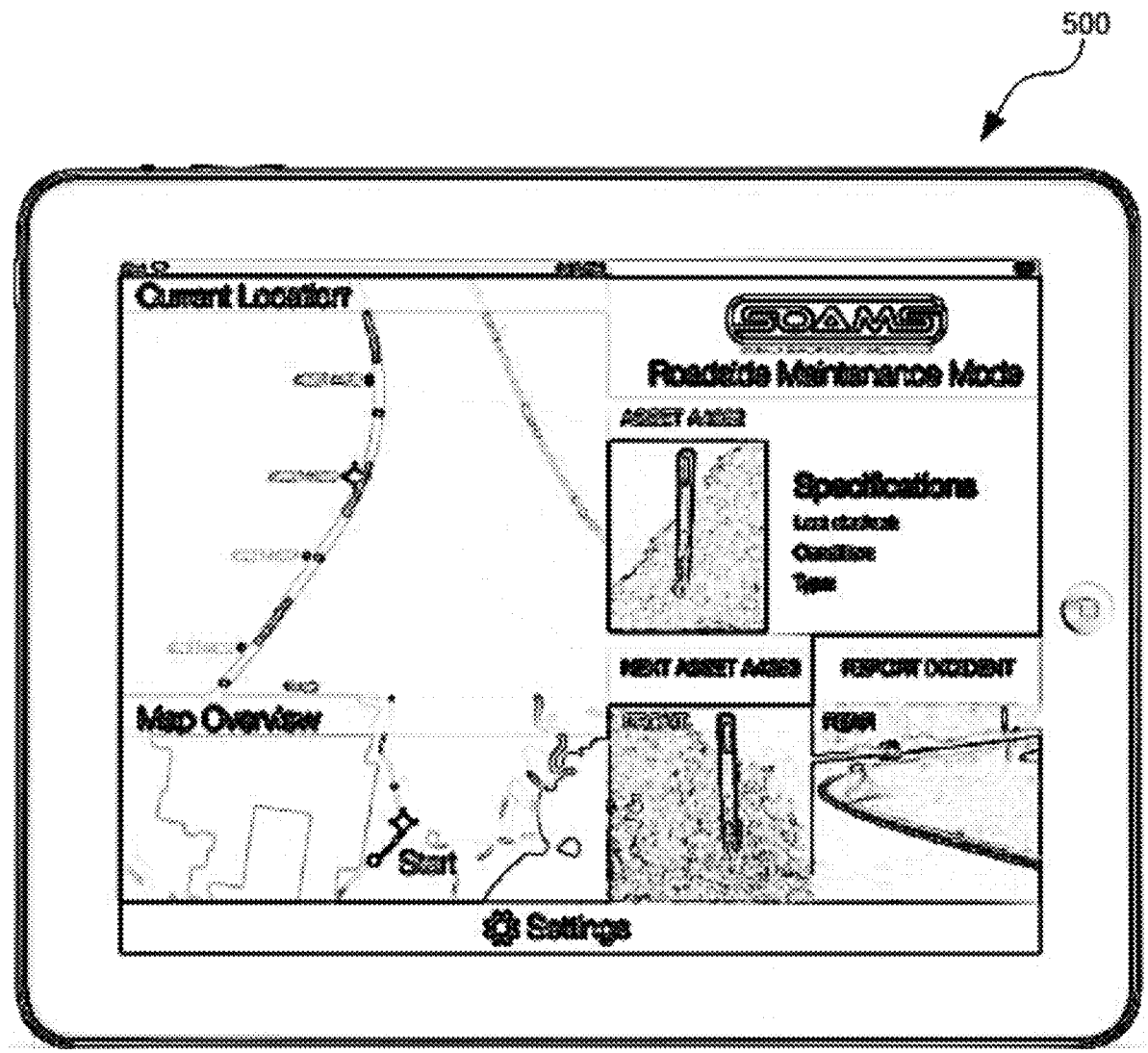
FIGS. 5 and 6 show exemplary graphical user interfaces displayed by the data capture device of the system of FIG. 1 in accordance with an embodiment of the present disclosure.
Figure 6:
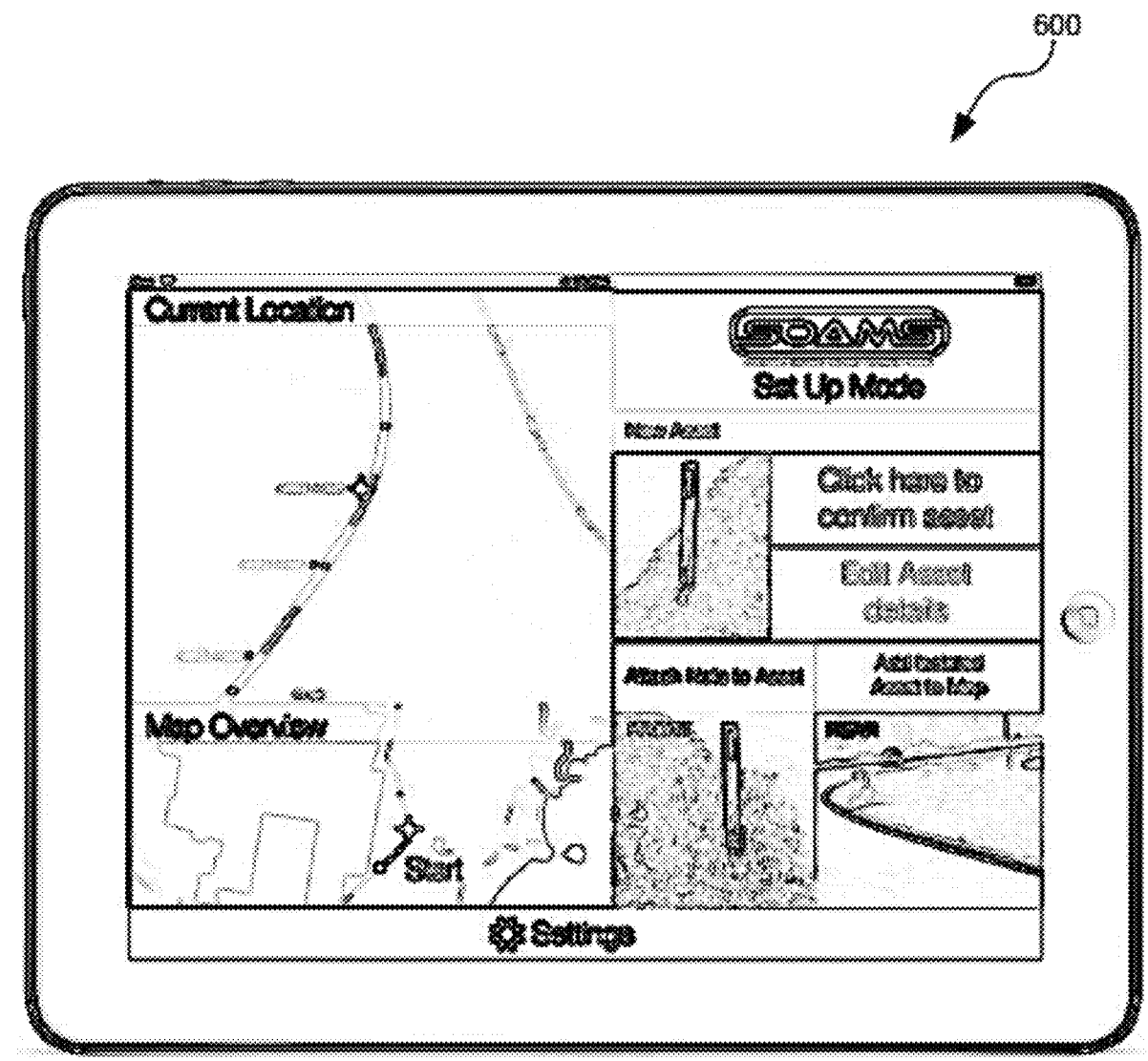

FIGS. 5 and 6 show exemplary graphical user interfaces displayed by the display device of the data capture device 105.

Specifically, referring to FIG. 5, there is shown an exemplary graphical user interface 500 wherein the data capture device 105 is in roadside maintenance mode.

Specifically, the left hand side of the interface 500 comprises a map representation comprising a bottom portion located map overview and a top located current location overview showing the location of the data capture device 105 overlaid a map representation. In the embodiment shown, the data capture device 105 is shown as the crosshair icon adjacent the roadside.

The map representation further comprises a plurality of icons representing the roadside assets. Any particular map representation shown, the data capture device 105 is represented as currently being adjacent and asset, one asset been represented as being in front of the data capture device 105 and two assets as been recorded as being behind the data capture device.

The right hand side of the interface 500 comprises asset specific information.

Specifically, the upper located portion comprises information relating to the current asset, as can be seen, the current asset has been allocated unique asset identify A4262 and there is shown image data relating to the asset. In this manner, the operator of the machinery 300 may visually compare the asset with the image data as recorded by the system 100 for comparison purposes. Adjacent the image data of the asset may be the further additional information relating to the asset, such as the type of asset, the condition, when the grass was last cut and the like.

Furthermore, the lower located portion of the interface 500 may comprise information relating to the next asset, given as asset A4263 and an appropriate image.

In this manner, by showing the proximate pre-recorded assets, the operator may easily identify if an asset is missing or has been damaged since the last recordal.

Furthermore, for the above-mentioned maintenance tracking purposes, the lower located portion of the interface 500 may further comprise a rearward view image of the rear of the maintenance vehicle as is captured by rearward facing camera 315 to record the grass as having been cut by the maintenance vehicle 300.

Turning now to FIG. 6, there is shown an exemplary graphical user interface 600 wherein the data capture device 105 is in setup mode. Specifically, during the setup mode, various assets may be recorded, such as during the above-mentioned first pass.

Specifically, the left hand side of the interface 600 is substantially the same as for interface 500. However, for the right hand side, the interface 600 comprises a portion allowing for the capturing of asset data.

As can be seen, the upper right-hand portion of the interface 600 allows the operator to record and asset for the first time. Specifically, this portion comprises an image of the asset for recordal. As mentioned above, the image of the asset may be taken manually by the operator, or in an automated manner such as wherein the data capture device 105 utilises image recognition technique, proximity detection or the like.

Once the image of the asset has been taken by the operator, or the asset identified by the data capture device 105, the interface 600 may allow the operator to confirm the asset including in inputting additional information relating to the asset.

Exemplary Graphical User Interfaces—Administrative Client Computing Device

Figure 7:
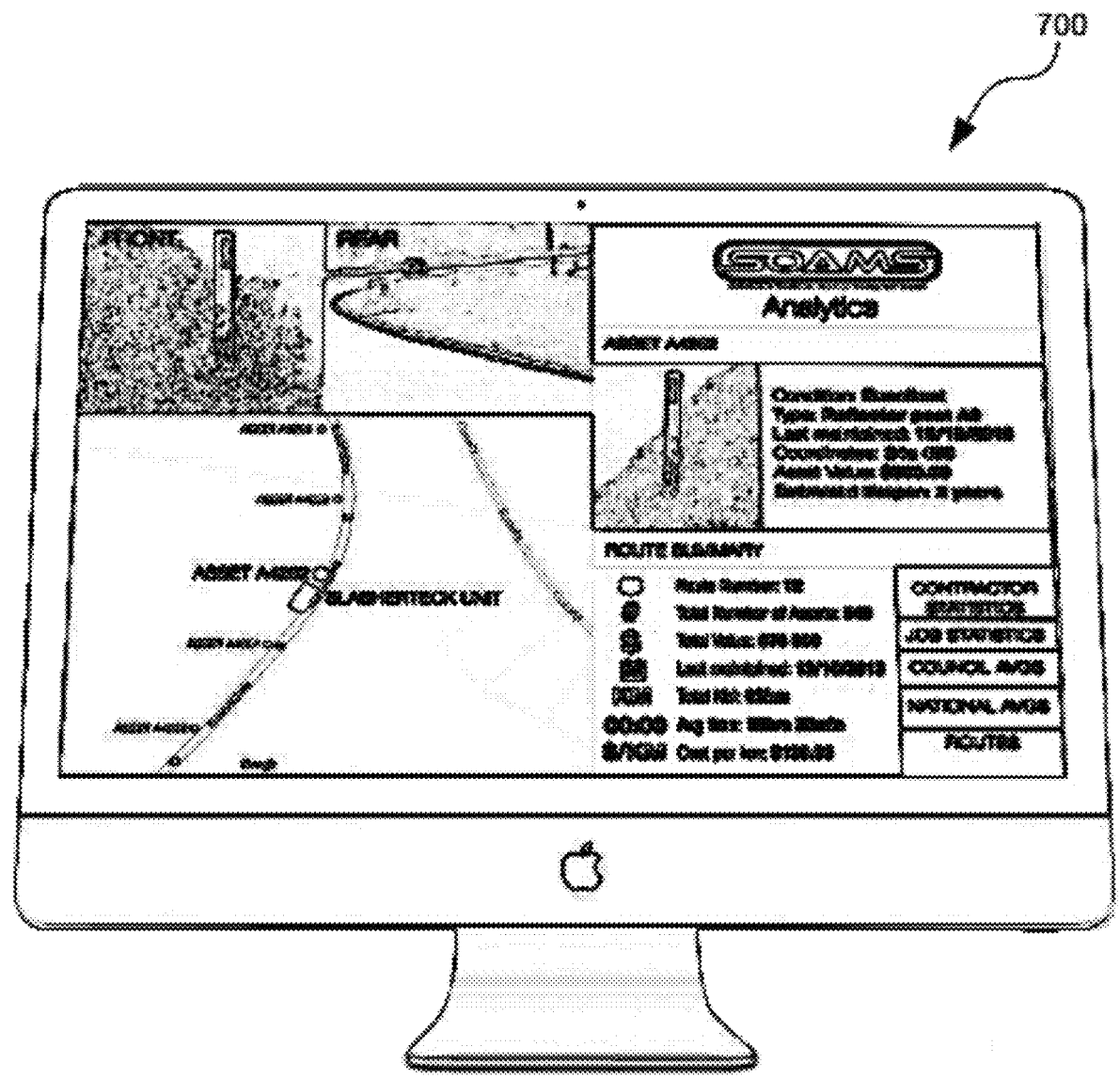
FIG. 7 shows an exemplary graphical user interface displayed by the administrative client computing device of the system of FIG. 1 in accordance with an embodiment of the present disclosure.

Turning now to FIG. 7, there is shown an exemplary graphical user interface 700 as displayed by the administrative client computing device 200. Typically, and as alluded to above, the client computing device 200 would be operated by various administrators, such as council workers and the like.

As can be seen, the lower left hand portion of the interface 700 comprises a map representation showing the location of the data capture device 105 and various recorded assets. In a preferred embodiment, the location of the data capture device 105 may be shown in real time.

Furthermore, a particular asset may be selected for the purposes of displaying further information. In the interface 700, asset a 4262 has been selected wherein, as can be seen, the top right-hand portion of the interface 700 comprises further information in relation to the asset including comprising an image of the asset, and additional information relating to the asset.

As can be seen, the additional information relating to the asset comprises additional information that the asset is in excellent condition, that it is a reflector post A3 was last maintained on 13 Oct. 2013, the coordinates of the asset, the asset value of $300 and the asset having an estimated life span of two years.

Furthermore, for the above mentioned maintenance tracking, the top left hand side of the interface 700 may comprise a rear image of the maintenance vehicle 300. In this manner, should the administrator visually identify from the image that the grass as not been cut correctly, the administrator may take appropriate action, such as by contacting the operator to take appropriate remedial action.

It should be noted that the substantial real time imagery from the maintenance vehicle 300 may be displayed within the interface 700. In other embodiments, a timelapse of the maintenance imagery may be shown wherein, for example, the operator drags the icon of the maintenance vehicle 300 to various locations along the map representation so as to be able to view the maintenance imagery at differing locations of the map.

Furthermore, the bottom right hand side of the interface 700 comprises various information relating to the particular maintenance task. As can be seen, this particular grass cutting maintenance task has been allocated to route number 12, that route number 12 has 543 assets totalling a value of $76,000, that the route was last maintained on 13 Oct. 2013, that route 1260 km in length, takes an average of 16 hours and 32 minutes to maintain and cost $130 per kilometre to maintain.

This portion of the interface 700 further comprises a menu allowing the administrator to view and manage various contract statistics, job statistics, council averages national averages and routes.

Exemplary Embodiment

There will now be described an exemplary embodiment method for roadside asset tracking and maintenance monitoring. Specifically, in this exemplary embodiment, the method comprises utilising a mobile unit, such as the maintenance machinery 300 as substantially shown in FIG. 3 for grass cutting, the mobile unit comprising a data capture device 100 (such as a small form factor tablet computing device) having an asset data capture device 115 (such as a camera for capturing roadside assert image data); an inbuilt or external global positioning system (GPS) receiver 110 and a data interface 125 for communicating with an asset management server 140, the asset management server 140 comprising an asset tracking register database 135.

The method comprises deploying a mobile unit 305 (such as the above-described maintenance machinery or the like) alongside a roadside section, primarily while performing roadside maintenance, but not necessarily so.

Now, the method comprises utilising an asset type image recognition technique for automating the identification of the roadside assets. For example, the roadside asset types may be divided into any number of roadside asset type categories such as posts, barriers, roadsigns and the like. Other categories, such as subcategories may also be utilised such as, for example, wherein roadsigns are divided into warning, informational and traffic management signs. For traffic management signs, such as speed management signs, further categories may be employed relating to the speed limit, for example.

Now, during any roadside pass or run, the method comprises inserting, into the asset tracking register database 135, newly identified assets and their respective locations. For example, should a new road post be installed on a road corner, the method may comprise identifying the new road post installed at the particular location of the updating of the database 135 to record the new post of a particular type and the new location.

Now, in a preferred embodiment, for subsequent passes, the method further comprises identifying missing roadside assets by comparing the previously identified asset types at the respective locations. For example, should a roadside signpost which had been previously identified be subsequently removed, during a subsequent pass of the mobile unit 305, the method may identify that the roadside asset is missing such that appropriate remedial action may be taken. For example, in embodiments, the system 100 may be configured such that, should the mobile unit 305 pass 10 m beyond from where a roadside asset was previously recorded, the system 100 may identify the asset as being missing.

When identifying a missing asset, the database 135 may be updated to flag the relevant missing roadside asset.

In embodiments, the operator of the mobile unit 305 may be prompted to confirm the missing asset including in the system 100 displaying an image of the asset as was previously recorded. The operator may then confirm that the roadside asset is indeed missing.

In this manner, the system 100 may generate a register of remedial action tasks specify in roadside assets that require replacing.

Now, as alluded to above, the asset data capture device 115 comprises a camera (or is operably couples to a camera) for capturing roadside asset image data. In this manner, the method comprises utilising image recognition for identifying the roadside asset types.

For example, along the roadside section the camera may capture periodic images, such as in front of the mobile unit 300, or that which is engaged by the grass cutting device 310 and wherein the method comprises employing the asset type image recognition to identify assets from those images. For example, the method may comprise identifying roadside posts, roadside signage and the like from the image is captured by the camera.

In a preferred embodiment, especially given the computationally intensive nature of image identification, the data capture device 105 may transmit the image data and the location data from the location sensor 110 to the server 140 for processing by the server 140.

Now, so as to suit the image recognition for roadside asset identification, the image recognition may comprise a number of image recognition stages described below.

As such, in embodiments, the image recognition may comprise an image recognition stage comprising edge shape detection to detect shapes of roadside assets. Edge detection may be performed in accordance with intensity (such as from greyscale images) or colour variations between the roadside asset and the background.

For example, roadside posts may have a distinctive rectangular shape having particular dimension ranges allowing the method to identify such roadside posts accordingly.

Now, particular for roadside signage, differing types of roadside signs may comprise differing shapes which may be utilised when identifying the roadside assets. For example, warning signs may have a triangular shape whereas traffic management signs may have a circular shape. In this manner, by identifying a particular shape, the method may identify the sign type when identifying a roadside asset.

In embodiments, the method may comprise utilising shape rotation invariance filtering to account for roadside signs which are not exactly upright, such as those that have been installed or knocked skew. In this manner, should a triangular sign be skew, the image identification may yet recognise the triangular shape.

Image recognition may further comprise colour detection so as to further enhance the image identification. For example, the above-described roadside posts may have a distinctive white colouring which may assist the identification thereof. Furthermore, and especially for roadside signs, the above-described different types of roadside signs may have differing colour types also.

In embodiments, and especially for roadside signs, the colour detection may comprise colour juxtaposed detection so as to, for example, identify a red border against a white background of a restrictional roadside sign.

In a further embodiment, the image recognition may comprise symbol detection. For example, roadside signage may comprise differing symbols, such as, a koala bear symbol shape warning of wildlife ahead. The symbols may further represent alphanumeric symbols such as numbering utilised on speed management signs. In further embodiment, the image recognition may utilise text recognition so as to identify, text utilised within roadside signage.

In embodiments, the image recognition may utilise a combination of the above described image recognition techniques. For example, in one embodiment, the image recognition may utilise a combination of both shape detection and symbol detection. For further accuracy, colour detection may additionally be employed.

In embodiments, the image recognition may utilise reference databases for the purposes of enhancing accuracy. For example, in one embodiment, the method may comprise utilising correlation to correlate the captured roadside asset image data with known roadside assets stored within a roadside assets image database. It should be noted that such image correlation may be performed in accordance with the entire image. However, in embodiments, correlation may be performed utilising the separate shape, colour, symbol and text reference databases.

For example, in identify a triangular shape and a koala bear symbol, the system 100 may identify the particular type of roadside signage accordingly.

Now, in one embodiment, the mobile unit asset data capture device 115 comprises a detector in the form of an asset proximity detector to detect the proximity of the roadside asset. The detector may trigger the asset data capture device 115 to capture an image of the roadside asset.

For example, in the embodiment where the mobile unit comprises a grass cutter 310 as is substantially provided in FIGS. 3 and 4, the detector may take the form of a physical contact, laser trip or the like 405 within the grass cutter asset engagement 410. In this manner, when the grass cutter 310 engages an asset within the asset engagement 410 to cut around the asset, the correspondingly located camera, having a view of the grass cutter 310 captures an image of the asset.

It should be noted that in embodiments, the grass cutter 305 may comprise a plurality of grass cutter devices such as the frontward located grass cutter device 310 as substantially shown in FIG. 4 and a side arm gantry-type movable grass cutter device (not shown). For example, the side arm movable grass cutter device may be utilised for performing delicate grass cutting, such as around posts of a roadside barrier or the like. In this manner, the mobile unit 305 may comprise a side facing camera so as to be able to capture image data of assets engaged by the side arm cutting device also.

In embodiments, where the side arm is movable the side facing camera may be gimbal mounted or the like so as to follow the location of the end of the side arm.

In embodiment, the side movable grass cutting device may be marked with a laser so as to allow the side camera to follow the grass cutting device.

The method may further comprise image comparison for detecting roadside asset damage or degradation to identify roadside assets requiring maintenance. For example, the method may compare asset image data against previously recorded asset image data and detect changes in colour, shape, the symbols or text represented on roadside asset (so as to identify missing letters and the like For those assets that show a change in colour or shape exceeding a threshold may trigger the system to update the database 135 with a flag indicating that a particular asset requires maintenance. For example, should a roadside be damaged in a bushfire and therefore be blackened, the image comparison may detect the colour degradation and flag the asset for maintenance.

Furthermore, should a roadside post be hit by a passing vehicle all of the like and therefore be skew or otherwise bent out of shape, the system may identify the change of shape or orientation and flag the asset for maintenance.

Furthermore, should a letter be missing from a roadside signpost, the system may identify the missing letter or the change to the text and flag the roadside signpost for maintenance.

The method may further comprise generating a map representation showing the roadside sections and the locations of the roadside assets along the roadside section. Specifically, FIGS. 5 and 6 show the map presentation which may be displayed by the data capture device 100 on the mobile unit on FIG. 7 may display the representation displayed at a headquarters.

As can be seen, the representations comprise a map representation representing the roadside section and the locations of the identified roadside assets along the roadside section. The map representation at headquarters may display the current location of the mobile unit.

Clicking on each of the icons of each respective roadside asset may display further information in relation to each roadside asset, including an image of the roadside asset, such as a front and rear image of the roadside asset with such as available.

The map representation is displayed by the mobile unit may display image data relating to the closest asset, such as the next roadside asset including an image of the next roadside asset. In this manner, the operator may view the previously recorded image of the asset and report any changes to the asset that the operator notices. For any newly identified asset, the mobile unit operator interface allows the operator to confirm that new asset and input other information such as any further characteristics or notes.

In embodiments, the operator interface may allow the operator to report incidents, such as wildlife casualties or roadside hazards, such as flooding, fire and the like.

Now, in embodiments, and referring to FIG. 3, as can be seen, the mobile unit 305 may comprise a forward camera 320 and a rearward camera 315 for respectively capturing forward and rearward image data from the perspective of the mobile unit.

As such, at headquarters, perspective views may be displayed by the interface 700 either in real time from the current location of the mobile unit, or at any particular locations, such as a road bend or the like.

In embodiments, the image data recorded from the cameras 315 and 320 may be utilised at headquarters for quality control purposes by comparing before and after maintenance imagery. For example, should the mobile unit have cut the grass to the incorrect height, such may be noticed from the imagery and rectified maintenance instructions sent to the mobile unit.

Now, especially referring to the interface 700 as substantially shown in FIG. 7, the method may further comprise calculating a valuation of the roadside assets along the roadside section. In this regard, the valuation may be calculated in accordance with the assets type which has been identified using the above-described asset type image recognition technique. For example, the database 135 may comprise a register of asset type values which may be taken into account in determining the value of the roadside assets.

In embodiments, the method may take into account depreciation wherein the date at which the asset was first installed are identified by the method may be taken into account wherein, for example, road posts may be depreciated over 2 years. In this regard, the method may further comprise identifying those roadside assets requiring replacement on account of their having reached the end of their service life.

Calculating the valuation of the assets may further take into account the condition of the asset. In embodiment, the method may utilise an asset condition estimate image recognition technique for estimating a condition of each of the roadside assets. For example, referring to the exemplary interface 700 as can be seen, asset A4262, the condition of the asset has been deemed to be excellent. The asset condition estimate image recognition technique to take into account various factors in determining the condition, such as colour, shape and the like.

As can be seen, the interface 700 further displays various maintenance statistics including at least one of last maintenance date, distance of the roadside section and average time to maintain the roadside section.

It should be noted that in embodiments, as opposed to the data capture device 105 being located on a movable unit, such as the maintenance machinery 105 and the like, the data capture device 105 may be a portable unit configured for pedestrian utilisation. In this manner, for example, a user may walk along a trail, route or the like capturing information relating to various route or trail assets. In embodiment, the data capture device 105 may take the form of a tablet computing device have an inbuilt camera, GPS and data connectivity functionality configured with appropriate software such that no substantial hardware modification need be required.

Interpretation

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A method for roadside asset tracking and maintenance monitoring, the method comprising:
    periodically deploying a vehicle alongside a roadside section, the vehicle comprising:
        a grass cutter unit controllable to be moveable with respect to the vehicle;
        at least one digital camera configured to follow the movement of the grass cutter unit;
        a data capture device comprising:
            an asset proximity detector for detecting the proximity of roadside assets;
            an asset data capture device operably coupled to the at least one digital camera configured for capturing roadside asset image data, the asset data capture device triggered by the asset proximity detector;
            a global positioning system (GPS) receiver; and
            a data interface for communicating with an asset management server, the server comprising an asset tracking register database;
    receiving the roadside asset image data representing images taken of a plurality of roadside assets;
    receiving location data from the GPS receiver representing the respective locations the roadside assets;
    utilising an asset type image recognition technique for automating the identification of the roadside assets;
    comparing roadside asset data of the asset tracking register database to:
        record newly identified roadside assets and their respective locations in the asset tracking register database; and
        identify missing roadside assets.

2. The method as claimed in claim 1, wherein the asset type image recognition technique comprises an image recognition stage comprising edge shape detection.

3. The method as claimed in claim 2, wherein the edge shape detection comprises rotation invariance processing to allow for edge shape detection of skew roadsign assets.

4. The method as claimed in claim 3, wherein edge shape detection comprises comparison to reference shapes in a shape reference database.

5. The method as claimed in claim 1, wherein the image recognition comprises an image recognition stage comprising colour detection.

6. The method as claimed in claim 5, wherein the colour detection comprises colour juxtapose detection.

7. The method as claimed in claim 6, wherein colour detection comprises comparison to reference colours in a colour reference database.

8. The method as claimed in claim 1, wherein the image recognition comprises an image recognition stage comprising symbol detection.

9. The method as claimed in claim 8, wherein symbol detection comprises comparison to reference symbols in a symbol reference database.

10. The method as claimed in claim 8, wherein symbol detection comprises alphanumeric symbol detection.

11. The method as claimed in claim 8, wherein symbol detection comprises text recognition.

12. The method as claimed in claim 1, wherein the method further comprises image comparison for detecting roadside asset damage or degradation to identify assets requiring maintenance.

13. The method as claimed in claim 12, wherein the image comparison comprises colour comparison.

14. The method as claimed in claim 12, wherein the image comparison comprises shape comparison.

15. The method as claimed in claim 12, wherein the image comparison comprises colour detection.

16. The method as claimed in claim 12, wherein the image comparison comprises symbol comparison.

17. The method as claimed in claim 1, wherein the method further comprises generating a map representation representing the roadside section and the locations of the identified roadside assets along the roadside section.

18. The method as claimed in claim 17, wherein the vehicle comprises at least one camera for capturing data from the perspective of the vehicle and wherein the map representation is configured for selectively displaying image data from the at least one camera at a plurality of locations along the roadside section.

19. The method as claimed in claim 17, wherein the vehicle comprises forward and rearward facing cameras for respectively capturing forward and rearward facing image data from the perspective of the vehicle and wherein the map representation is configured for displaying before and after maintenance comparison imagery utilising the image data received from the forward and rearward facing cameras.

\* \* \* \* \*